United States Patent
Takakura et al.

(10) Patent No.: US 9,272,646 B2
(45) Date of Patent: Mar. 1, 2016

(54) PLASTIC FOAMED ARTICLE

(75) Inventors: Shinji Takakura, Koga (JP); Soichiro Yamazaki, Tokyo (JP)

(73) Assignee: Sekisui Plastics Co., Ltd., Osaka-shi (JP)

( * ) Notice: Subject to any disclaimer, the term of this patent is extended or adjusted under 35 U.S.C. 154(b) by 116 days.

(21) Appl. No.: 14/241,307

(22) PCT Filed: Aug. 28, 2012

(86) PCT No.: PCT/JP2012/071647
§ 371 (c)(1),
(2), (4) Date: Feb. 26, 2014

(87) PCT Pub. No.: WO2013/031750
PCT Pub. Date: Mar. 7, 2013

(65) Prior Publication Data
US 2014/0193605 A1    Jul. 10, 2014

(30) Foreign Application Priority Data
Aug. 30, 2011 (JP) .................................. 2011-187572

(51) Int. Cl.
*B60N 2/48* (2006.01)
*A47C 7/38* (2006.01)
*B60N 2/68* (2006.01)

(52) U.S. Cl.
CPC ............. *B60N 2/4879* (2013.01); *A47C 7/383* (2013.01); *B60N 2/48* (2013.01); *B60N 2/682* (2013.01); *Y10T 428/24008* (2015.01)

(58) Field of Classification Search
CPC ........ B60N 2/48; B60N 2/4879; B60N 2/682; Y10T 428/24008
USPC ....................................................... 428/99, 98
See application file for complete search history.

(56) References Cited

U.S. PATENT DOCUMENTS 5,165,754 A    11/1992  Louys

FOREIGN PATENT DOCUMENTS

| JP | 07-051100 | B2 | 6/1995 | |
|----|-----------|----|--------|---|
| JP | 2002-085188 | A | 3/2002 | |
| JP | 2005-255100 | A | 9/2005 | |
| JP | 3915778 | B2 | 5/2007 | |
| JP | 3915778 | B2 * | 5/2007 | ............... B60N 2/48 |
| JP | 4376705 | B2 | 12/2009 | |

OTHER PUBLICATIONS

International Search Report dated Oct. 2, 2012, issued for PCT/JP2012/071647.

* cited by examiner

*Primary Examiner* — Brent O'Hern
(74) *Attorney, Agent, or Firm* — Locke Lord LLP (57) ABSTRACT

Provided is a plastic foamed article to be attached to an attaching target having a rod-shaped attaching portion having a radial direction, the plastic foamed article including a holding portion for holding the attaching portion in the radial direction in a state attached to the attaching target, the holding portion including a pair of opposite surfaces facing each other for holding the attaching portion between the pair of opposite surfaces and a protrusion provided on one of the pair of opposite surfaces, and at least a part of the protrusion is configured to be elastically deformed by the attaching portion in a state in which the attaching portion is held between the pair of opposite surfaces.

20 Claims, 5 Drawing Sheets

PLASTIC FOAMED ARTICLE

CROSS-REFERENCE TO RELATED APPLICATIONS

This application claims priority to Japanese Patent Application No. 2011-187572, the disclosure of which is incorporated herein by reference in its entirety.

FIELD

The present invention relates to a plastic foamed article to be attached to an attaching target having a rod-shaped attaching portion.

BACKGROUND

As this type of plastic foamed article, a plastic foamed article which is a core material used for a headrest for an automobile, configured capable of being attached to a headrest stay, and which protects the rear head part as a buffer material during vibration of the automobile and the like is known, for example (Patent Literature 1).

Such plastic foamed article is provided with a sandwiching portion having a pair of opposite surfaces facing each other. Moreover, the headrest stay has a substantially inverted U-shape and is provided with a pair of rod-shaped insertion portions arranged in parallel and a rod-shaped attaching portion for connecting together one ends of the pair of insertion portions and is configured so that the insertion portions are inserted into a seat body upper part from the other end side thereof.

The plastic foamed article is attached to the headrest stay by pushing the attaching portion into a space between the pair of opposite surfaces so as to sandwich the attaching portion in a radial direction.

Here, in the plastic foamed article, when a distance between the opposite surfaces of the sandwiching portion is larger than a size of the attaching portion in the radial direction, when it is attached to the headrest stay as above, the attaching portion cannot be sandwiched and becomes loose.

Considering the above-described point, the prior-art plastic foamed article is configured so that the distance between the opposite surfaces of the sandwiching portion is smaller than the size of the attaching portion in the radial direction. That is, in a state in which such plastic foamed article sandwiches the attaching portion, the attaching portion is depressed by a predetermined depth on each of the opposite surfaces.

CITATION LIST

Patent Literature

Patent Literature 1: JP 2005-255100 A

However, in the conventional plastic foamed article, when the attaching portion is sandwiched between the pair of opposite surfaces of the sandwiching portion, in order that the attaching portion is depressed by the predetermined depth on each of the opposite surfaces of the sandwiching portion, pushing in with a strong force is required. Therefore, such sandwiching work (particularly; a pushing-in work) is a work with a heavy burden on a worker. Such problem occurs not only when the plastic foamed article is attached to the headrest stay for a vehicle such as an automobile but also in general when the plastic foamed article is attached to an attaching target having a rod-shaped attaching portion such as a case of fixation to an armrest stay for a vehicle, for example.

SUMMARY

Technical Problem

The present invention was made in view of the above-described point and has an object to provide a plastic foamed article which can easily hold the rod-shaped attaching portion of the attaching target and also can prevent looseness with respect to the attaching target.

Solution to Problem

In order to solve the above-described problem, there is provided a plastic foamed article according to the present invention was made, and is a plastic foamed article to be attached to an attaching target having a rod-shaped attaching portion having a radial direction, provided with a holding portion for holding the attaching portion in the radial direction in a state of being attached to the attaching target, the holding portion being provided with a pair of opposite surfaces facing each other for holding the attaching portion between the pair of opposite surfaces and a protrusion provided on one of the pair of opposite surfaces, and the protrusion being configured so that at least a part thereof is elastically deformed by the attaching portion in a state in which the attaching portion is held between the pair of opposite surfaces.

Moreover, in the plastic foamed article according to the present invention, the protrusion is preferably provided so as to occupy 2 to 15% of an area between the pair of opposite surfaces on a projection plane on a front view along the radial direction of the attaching portion in the held state and a planar direction along the pair of opposite surfaces.

Moreover, in the plastic foamed article according to the present invention, the protrusion preferably has a semicircular projection shape on a front view.

Moreover, in the plastic foamed article according to the present invention, a region between the pair of opposite surfaces is open on one side in the radial direction of the attaching portion in the held state and also in the planar direction along the pair of opposite surfaces, while the other side is closed by a connecting surface connecting the pair of opposite surfaces. The protrusion extends from an end portion on the one side to an end portion on the other side of one of the pair of opposite surfaces, and a tip end portion of the protrusion corresponding to the end portion on the one side is preferably inclined so that a protruding amount decreases from the other side to the one side.

Moreover, in the plastic foamed article according to the present invention, the protrusion is provided in plural, and the plurality of protrusions are preferably provided on one of the pair of opposite surfaces along a longitudinal direction of the attaching portion in the held state at substantially equal intervals.

Moreover, in the plastic foamed article according to the present invention, the protrusion is provided in plural, and the plurality of protrusions are preferably provided on each of the pair of opposite surfaces.

DESCRIPTION OF EMBODIMENTS

Figure 1A:
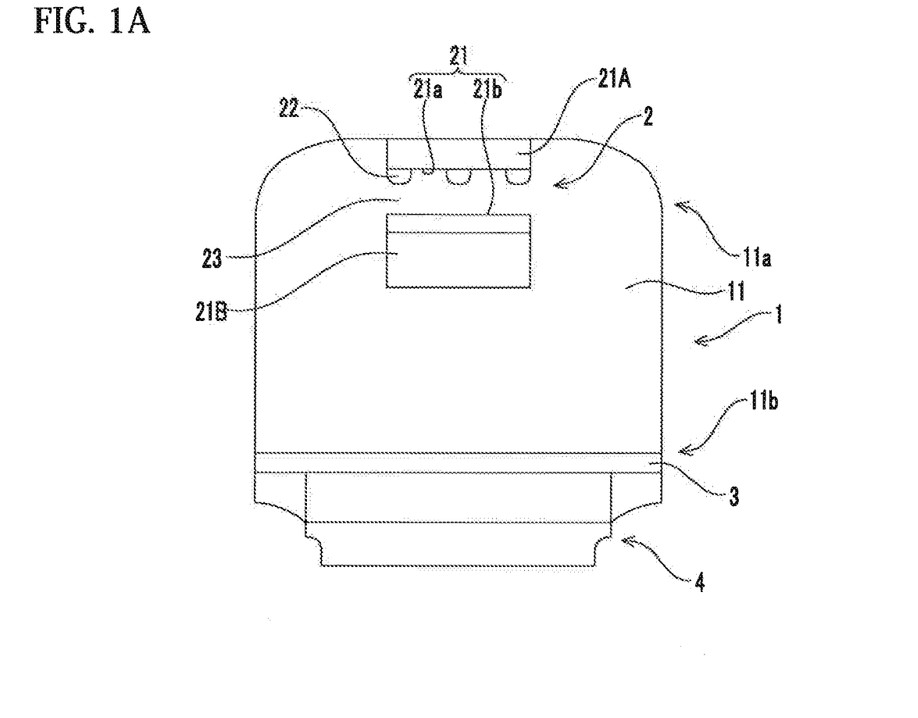
FIG. 1A is a front view of a plastic foamed article according to an embodiment of the present invention.

An embodiment of a plastic foamed article according to the present invention is described by referring to the attached drawings. In the following invention, a front view means a view of the plastic foamed article when seen from a direction where a projection view as illustrated in FIG. 1A can be obtained. On the basis of the front view in FIG. 1A, a vertical direction and a horizontal direction are specified, and a direction from the front to the back of the paper is specified as a thickness direction.

The plastic foamed article according to this embodiment is used as a core material for a headrest for a vehicle such as an automobile, for example, and is configured to be attached to a headrest stay.

Figure 1B:
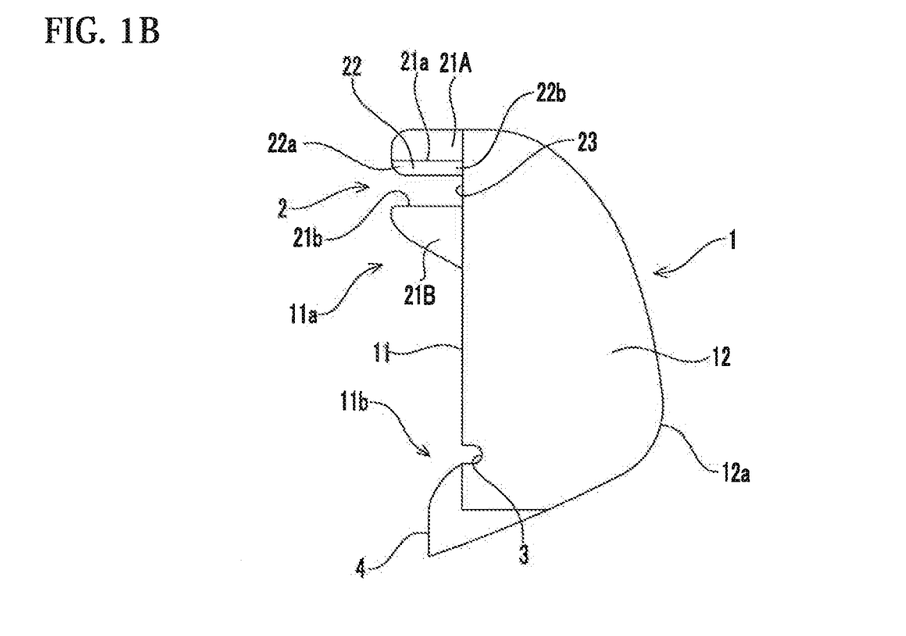
FIG. 1B is a side view of the plastic foamed article.

The plastic foamed article is, as illustrated in FIGS. 1A and 1B, integrally molded by including a body portion having a projecting shape from one side to the other side forming a planar shape in a thickness direction on a plan view, a holding portion 2 provided on an upper part side 11a on the one side in a thickness direction of the body portion 1, a groove portion 3 provided on a lower part side 11b on the one side in the thickness direction of the body portion 1, and an auxiliary portion 4 provided on the lower part side 11b below the groove portion 3.

The body portion 1 is a block body having a substantially rectangular shape on the front view. One side in the thickness direction on the front view (meaning a front side on the front view and hereinafter also simply referred to as a front side) forms a planar-shaped planar portion 11, while the other side (meaning a depth side on the front view and hereinafter also simply referred to as a depth side) of the body portion 1 forms a projecting portion 12 projecting from the one side to the other side. The projecting portion 12 has a shape inclined from a top portion 12a separating away from the planar portion 11 toward the upper part side 11a and the lower part side 11b of the planar portion 11. The holding portion 2 is formed on the upper part side 11a of the planar portion 11 of the this configured body portion 1, and the groove portion 3 and the auxiliary portion 4 are formed on the lower part side 11b.

The holding portion 2 is provided with an opposing portion 21 having a pair of opposite surfaces 21a and 21b facing each other in parallel and separating in a vertical direction and one or a plurality of protrusions 22 provided on at least one of the surfaces of the pair of opposite surfaces 21a and 21b and elastically deformed.

The opposing portion 21 is provided with the pair of opposite surfaces 21a and 21b and a connecting surface 23 connecting the pair of opposite surfaces 21a and 21b.

The pair of opposite surfaces 21a and 21b are composed of the upper surface 21a located on the upper side and the lower surface 21b located on the lower side. Each of the both surfaces 21a and 21b has a rectangular plane, and they are planes parallel in a horizontal direction and the thickness direction on the front view. Moreover, the sizes of the surfaces of the both surfaces 21a and 21b are substantially the same as each other, that is, the lengths in the horizontal direction and the thickness direction of the upper surface 21a and the lower surface 21b are substantially the same as each other, and the length in the horizontal direction is longer than the length in the thickness direction. Moreover, the lengths in the horizontal direction of both the surfaces 21a and 21b are shorter than the length in the horizontal direction of the planar portion 11. Such pair of opposite surfaces 21a and 21b project from the depth side toward the front side in the thickness direction on the front view on the upper part side 11a of the planar portion 11 of the body portion 1.

In more detail, in the pair of opposite surfaces 21a and 21b, the upper surface 21a is formed on a lower part of an upper piece 21A, while the lower surface 21b is formed on an upper part of a lower piece 21B. The upper piece 21A projects from the depth side toward the front side in the thickness direction on the front view, and an upper part is provided substantially horizontally from the depth side to the front side without inclination, while the upper surface 21a is provided on a lower part. The lower piece 21B projects from the depth side to the front side in the thickness direction on the front view, and the lower part is inclined upward from the depth side toward the front side, while the lower surface 21b is provided on an upper part. The upper piece 21A and the lower piece 21B are provided such that the upper piece 21A is located on the upper side and the lower piece 21B on the lower side. The pieces 21A and 21B project from the upper part side 11a of the planar portion 11 of the body portion 1 with a distance from each other in the vertical direction on the front view.

The connecting surface 23 is a rectangular plane. Specifically, the connecting surface 23 is a plane parallel in the vertical direction and the horizontal direction on the front view, and the length in the vertical direction is shorter than the length in the horizontal direction. Moreover, the length in the vertical direction is substantially the same as the distance in the vertical direction between the pair of opposite surfaces 21a and 21b, and the length in the horizontal direction is substantially the same as the length in the horizontal direction of the pair of opposite surfaces 21a and 21b. The connecting surface 23 connects end portions on the depth side of the opposite surfaces 21a and 21b between the pair of opposite surfaces 21a and 21b, that is, the connecting surface 23 is provided in flush with the planar portion 11 of the body portion 1. Therefore, the opposing portion 21 forms a symmetrical shape having a substantially C-shape on a right side view by the pair of opposite surfaces 21a and 21b and the connecting surface 23 (See FIG. 1B). In other words, in the opposing portion 21, one side (front side) in the thickness direction on the front view of a region surrounded by the pair of opposite surfaces 21a and 21b and the connecting surface 23 is open, while the other end (depth side) is closed. Moreover, in the opposing portion 21, the horizontal direction on the front view of the region surrounded by the pair of opposite surfaces 21a and 21b and the connecting surface 23 is open. On the upper surface 21a of the pair of opposite surfaces 21a and 21b of the opposing portion 21, the plurality of protrusions 22 are provided on a part thereof.

Each of the plurality of protrusions 22 has a projecting shape in the vertical direction on the front view. In this embodiment, each of the plurality of protrusions 22 is formed on the upper surface 21a and projects downward on the front view, that is, projects from the upper surface 21a of the pair of opposite surfaces 21a and 21b toward the opposing lower surface 21b. Moreover, each of the plurality of protrusions 22 has an elongated shape in the thickness direction having a predetermined width in the horizontal direction, has a base end portion 22b on the other side in the thickness direction, and has a tip end portion 22a on the one side. Each of the plurality of protrusions 22 has a semicircular projection shape on the front view, that is, a sectional shape in the vertical direction is semicircular.

In more detail, a width in the horizontal direction of each of the plurality of protrusions 22 is smaller than the length in the horizontal direction of each of the pair of opposite surfaces 21a and 21b. Moreover, the length in the thickness direction of each of the plurality of protrusions 22 is substantially the same as the length in the thickness direction of each of the pair of opposite surfaces 21a and 21b. Moreover, each of the plurality of protrusions 22 is smaller than the distance between the pair of opposite surfaces 21a and 21b. Specifically, a protruding amount of each of the plurality of protrusions 22 is substantially the same from the base end portion 22b on the other side in the thickness direction to the tip end portion 22a on the one side and decreases toward the one side on the tip end portion 22a on the one side. That is, a height of each of the plurality of protrusions 22 is substantially the same from the base end portion 22b on the other side in the thickness direction to the tip end portion 22a on the one side and gradually decreases with upward inclination having R-shape outward (front side) in the thickness direction on the tip end portion 22a on the one side.

Moreover, the plurality of protrusions 22 are configured so as to occupy 2 to 15% of the area between the pair of opposite surfaces 21a and 21b on the projection plane on the front view. Here, the area of one protrusion 22 in the projection plane on the front view, that is, a projected area on the front view of one protrusion 22 is a perpendicular sectional area in the horizontal direction or the vertical direction of the one protrusion 22, specifically, a semicircular area. Thus, the projected area on the front view of the plurality of protrusions 22 is the total sum of the areas of the plurality of semicircular shapes. The area on the projection plane on the front view of a space between the pair of opposite surfaces 21a and 21b, that is, a projected area on the front view of the space between the pair of opposite surfaces 21a and 21b is an area of the connecting surface 23. Therefore, a relationship between the plurality of protrusions 22 and the projected area of the space between the pair of opposite surfaces 21a and 21b is expressed by an equation as follows:

(Projected area on front view of plurality of protrusions 22)/(projected area on front view of space between pair of opposite surfaces 21a and 21b)×100=2 to 15

Here, when the protrusion 22 is made of one protrusion, the left side of the above-described equation can be expressed as follows:

(Projected area on front view of one protrusion 22)/(projected area on front view of space between pair of opposite surfaces 21a and 21b)×100

The plurality of protrusions 22 preferably occupy 3 to 10% and more preferably occupy 4 to 8% of the area of the space between the pair of opposite surfaces 21a and 21b in the projected plane on the front view.

The thus configured plurality of protrusions 22 are provided from end portions on the other side (depth side) in the thickness direction of the upper surface 21a of the pair of opposite surfaces 21a and 21b to end portions on the one side (front side) (that is, so as to cross the horizontal direction or preferably so as to cross the horizontal direction at a right angle), and the base end portion 22b corresponding to the end portion on the other side continues to the connecting surface 23. The plurality of protrusions 22 are provided in the number of three along the horizontal direction of the upper surface 21a at substantially equal intervals. Specifically the plurality of protrusions 22 are provided one each at both ends in the horizontal direction of the upper surface 21a and at the center part. In this embodiment, the case in which the protrusion 22 is constituted by a plurality of protrusions is described, but the protrusion 22 can be constituted by one protrusion, and the number of protrusions 22 is not particularly limited.

The groove portion 3 defines an elongated groove and its section has a semicircular recessed shape. The thus configured groove portion 3 defines a recessed strip extending over the whole length in the horizontal direction of the lower part side 11b of the planar portion 11 of the body portion 1.

The auxiliary portion 4 is a block body having a substantially rectangular shape on the front view and is inclined from the lower side in the vertical direction and the other side (depth side) in the thickness direction on the front view toward the one side (front side). The length in the horizontal direction of the auxiliary portion 4 is smaller than the length in the horizontal direction of the planar portion 11 of the body portion 1 and larger than the length in the horizontal direction of the opposing portion 21. The thus configured auxiliary portion 4 extends from the other side (depth side) in the thickness direction toward the one side (front side) on the lower part side 11b lower than the groove portion 3 formed in the planar portion 11 of the body portion 1.

The plastic foamed article is made of a thermoplastic resin, for example, and is composed of one or two or more of polystyrene resin, polyolefin resin (polypropylene resin, polyethylene resin, for example), polyester resin (polyethylene terephthalate, polybutylene terephthalate, polyethylene naphthalate, for example), polycarbonate resin, polylactic resin and the like. Preferably, the plastic foamed article is made of a composite resin including polystyrene resin and polyethylene resin.

Figure 2A:
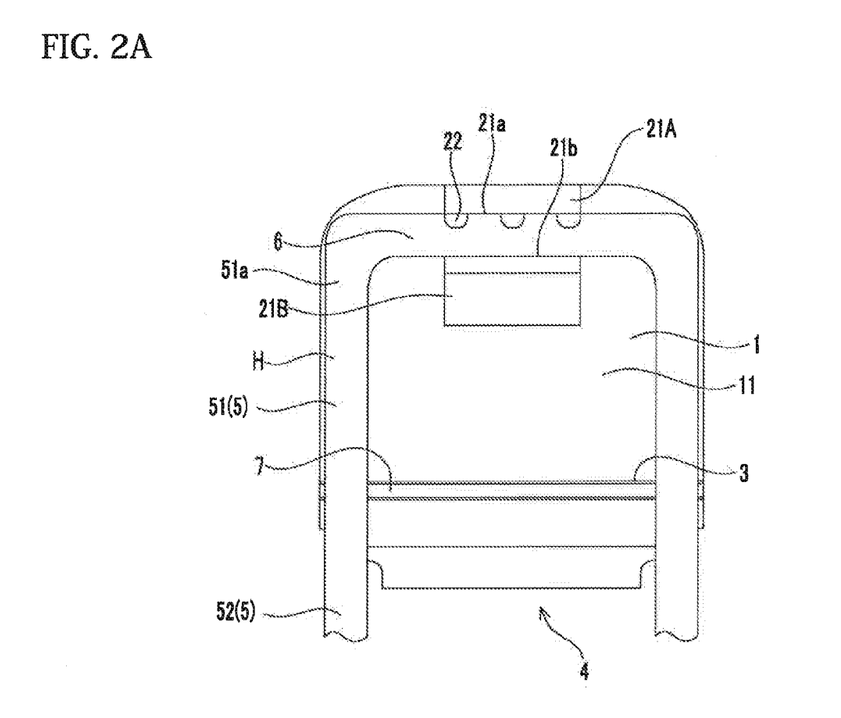
FIG. 2A is a front view of a state in which the plastic foamed article is attached to a headrest stay.
Figure 2B:
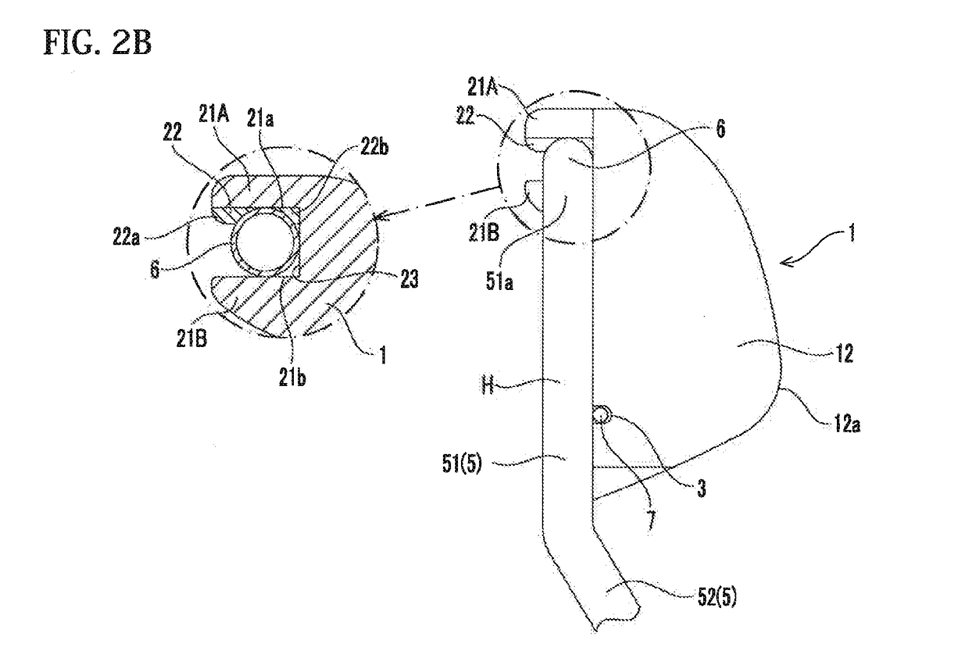
FIG. 2B is a side view of the state in which the plastic foamed article is attached to the headrest stay.

Moreover, a headrest stay H has, as illustrated in FIG. 2A and FIG. 2B, a substantially inverted U-shape as a whole. Specifically, the headrest stay H is provided with a pair of rod-shaped insertion portions 5 disposed in parallel with a distance from each other on the left and right sides, a rod-shaped attaching portion 6 formed along the left and right so as to connect one ends (upper ends) of the pair of insertion portions 5, and a rod-shaped auxiliary part 7 for connecting the pair of insertion portions 5 on a part lower than the attaching portion 6. This headrest stay H is installed on a seat body by being inserted into an upper part of the seat body from the other end side (lower end side) of the insertion portions 5.

The insertion portions 5 each have a cylindrical shape having a constant outer diameter and are provided with first linear portions 51 and 51 extending along the vertical direction and second linear portions 52 and 52 extending along diagonally downward from lower ends of the first linear portions 51 and 51 (specifically, an inclined direction toward the other side in the thickness direction as it goes closer to the lower side). A distance between the pair of juxtaposed insertion portions 5 (specifically, the pair of first linear portions 51 and 51 and the pair of second linear portions 52 and 52) is substantially the same as or slightly smaller than the length in the horizontal direction of the auxiliary portion 4 of the plastic foamed article. Moreover, a distance between the pair of insertion portions 5 is slightly smaller than the length in the horizontal direction of the planar portion 11 in the body portion 1 of the plastic foamed article and longer than the length in the horizontal direction of the pair of opposite surfaces 21a and 21b.

The attaching portion 6 has a cylindrical shape with a constant outer diameter and has a radial direction substantially the same as the diameter of each of the insertion portions 5. Moreover, the size in the radial direction of the attaching portion 6 is substantially the same as or smaller than the distance between the pair of opposite surfaces 21a and 21b of the plastic foamed article and larger than the distance between the pair of opposite surfaces 21a and 21b taking into account the height of the plurality of protrusions 22 (that is, the distance between the pair of opposite surfaces 21a and 21b less the protrusion height). Moreover, the length in the longitudinal direction (horizontal direction) of the attaching portion 6 is substantially the same as the length of the distance between the pair of insertion portions 5 and substantially the same as or slightly smaller than the length in the horizontal direction of the auxiliary portion 4 of the plastic foamed article. The thus configured attaching portion 6 extends from tip end portions 51a of the first linear portions 51 and 51 of the insertion portions 5 and connects the first linear portions 51 and 51 to each other.

The auxiliary part 7 has a columnar shape with a constant diameter, and the diameter is smaller than the outer diameters of the insertion portions 5 and the attaching portion 6 and substantially the same as or slightly smaller than the diameter dimension of the groove portion 3 (semicircular recess shape). Moreover, the length in the longitudinal direction (horizontal direction) of the auxiliary part 7 is slightly larger than the distance between the pair of insertion portions 5 and the length in the longitudinal direction (horizontal direction) of the attaching portion 6 and is substantially the same as the lengths in the horizontal direction of the planar portion 11 and the groove portion 3 of the body portion 1 of the plastic foamed article. The thus configured auxiliary part 7 connects the lower end portions of the first linear portions 51 and 51 of the insertion portions 5 to each other.

As illustrated in FIGS. 2A and 2B, the plastic foamed article having the above-described configuration is attached to the headrest stay H. Specifically; the plastic foamed article is attached to the headrest stay H by having the attaching portion 6 of the headrest stay H in the radial direction held between the pair of opposite surfaces 21a and 21b of the opposing portion 21 of the body portion 1.

Specifically explaining, regarding a region between the pair of opposite surfaces 21a and 21b, the one side and the other side in the horizontal direction on the front view, that is, the one side and the other side in the longitudinal direction of the attaching portion 6 in a state in which the attaching portion 6 is held between the pair of opposite surfaces 21a and 21b are both open. Moreover, regarding the region between the pair of opposite surfaces 21a and 21b, the other side (depth side) in the thickness direction on the front view, that is, the other side (depth side) in the radial direction of the attaching portion 6 and a planar direction of the opposite surfaces 21a and 21b in the state in which the attaching portion 6 is held between the pair of opposite surfaces 21a and 21b is closed by the connecting surface 23 connecting the opposite surfaces to each other, while the one side (front side) is open. The front view is, in other words, a view seen in the radial direction of the attaching portion 6 in the above-described held state and a view seen in the planar direction along the pair of opposite surfaces 21a and 21b (more specifically, along the opposite surface (the upper surface 21a in this embodiment) on which the plurality of protrusions 22 are provided in the pair of opposite surfaces 21a and 21b), and in more detail, a view seen in a direction from the one side (front side) to the other side (depth side) in the radial direction of the attaching portion 6 in the above-described held state and in the planar direction along the pair of opposite surfaces 21a and 21b. Alternatively, the front view is a view seen in a direction to be in parallel with the planar direction along the opposite surface on which the plurality of protrusions 22 of the pair of opposite surfaces 21a and 21b are provided (the upper surface 21a in this embodiment) in the radial direction of the attaching portion 6 in the above-described held state.

Thus, when the plastic foamed article is to hold the attaching portion 6, the attaching portion 6 is pushed into the space between the opposite surfaces 21a and 21b from the open one side (front side) to the connecting surface 23 on the other side (depth side) of the region sandwiched by the pair of opposite surfaces 21a and 21b. The pushed-in attaching portion 6 is brought into contact with the plurality of protrusions 22 provided on the upper surface 21a and compresses and elastically deforms the plurality of protrusions 22. Therefore, in a state in which the plastic foamed article holds the attaching portion 6 between the pair of opposite surfaces 21a and 21b, that is, in a state in which the plastic foamed article sandwiches the attaching portion 6 in the radial direction over the longitudinal direction of the attaching portion 6 between the pair of opposite surfaces 21a and 21b, the attaching portion 6 elastically deforms a part of the plurality of protrusions 22 on the upper surface 21a, and a pressing force as a restoring force caused by the elastic deformation of the plurality of protrusions 22 is generated so as to press the attaching portion 6 onto the lower surface 21b.

Moreover, the auxiliary portion 4 of the plastic foamed article is fitted into between the pair of rod-shaped first linear portions 51 and 51 of the headrest stay H and the auxiliary part 7 of the headrest stay H is fitted in the groove portion 3 of the plastic foamed article.

As described above, the plastic foamed article according to this embodiment is a plastic foamed article to be attached to the headrest stay H having the rod-shaped attaching portion 6 having the radial direction, provided with the holding portion 2 for holding the attaching portion 6 in the radial direction in the state attached to the headrest stay H, and the holding portion 2 is provided with the opposing pair of the opposite surfaces 21a and 21b, the pair of opposite surfaces 21a and 21b for holding the attaching portion 6 between the opposite surfaces, and the plurality of protrusions 22 provided on the upper surface 21a of the pair of opposite surfaces 21a and 21b. The plurality of protrusions 22 are configured to have at least a part elastically deformed by the attaching portion 6 in the state in which the attaching portion 6 is held between the pair of opposite surfaces 21a and 21b.

The plastic foamed article configured as above can be attached to the headrest stay H by having the attaching portion 6 held between the pair of opposite surfaces 21a and 21b of the holding portion 2.

Here, in the held portion, the plurality of protrusions 22 provided on the upper surface 21a of the pair of opposite surfaces 21a and 21b are brought into contact with the attaching portion 6 and are elastically deformed. Thus, in this plastic foamed article, while a contact area in the held portion with the headrest stay H is suppressed so as to suppress a force required for elastic deformation of the plurality of protrusions 22, the restoring force caused by the elastic deformation of the plurality of protrusions 22 can be made to act as the pressing force onto the attaching portion 6. Therefore, in this plastic foamed article, the attaching portion 6 can be easily held and at the same time, looseness with respect to the headrest stay H can be prevented.

Moreover, in the plastic foamed article according to this embodiment, the plurality of protrusions 22 are provided such that, in the projected plane on the front view in the radial direction of the attaching portion 6 in the held state and in the planar direction along the pair of opposite surfaces 21a and 21b, the plurality of protrusions 22 occupy 2 to 15% of the area between the pair of opposite surfaces 21a and 21b. As described above, since an occupied area of the plurality of protrusions 22 on the front view is set so as to occupy 2 to 15% of the area between the pair of opposite surfaces 21a and 21b in the projected plane on the front view, and in this plastic foamed article, while the contact area with the headrest stay H is suppressed so as to suppress the force required for the elastic deformation of the plurality of protrusions 22, the pressing force onto the attaching portion 6 can be ensured appropriately. Thus, this plastic foamed article can be attached to the headrest stay H easily and effectively.

When the plurality of protrusions 22 are configured to have an occupied area of 3 to 10%, which range is narrower than the aforesaid range, in the plastic foamed article, the contact area with the headrest stay H can be appropriately adjusted without excess or shortage and the force required for the elastic deformation of the plurality of protrusions 22 is suppressed, while the pressing force onto the attaching portion 6 can be effectively ensured. As a result, the plastic foamed article can be attached to the headrest stay H easily and effectively. Moreover, when the plurality of protrusions 22 are configured to have an occupied area of 4 to 8%, which range is extremely locally narrowed, in the plastic foamed article, the contact area with the headrest stay H is effectively adjusted so as to suppress the force required for the elastic deformation of the plurality of protrusions 22, while the pressing force onto the attaching portion 6 can be effectively ensured. As a result, the plastic foamed article can be attached to the headrest stay H easily and effectively.

Moreover, in the plastic foamed article according to this embodiment, each of the plurality of protrusions 22 has a semicircular projected shape on the front view. As described above, in this plastic foamed article, by making the projected shape on the front view of each of the plurality of protrusions 22 semicircular, the contact area with the headrest stay H is suppressed so as to suppress the force required for the elastic deformation of the plurality of protrusions 22, while the pressing force onto the attaching portion 6 can be ensured appropriately. Thus, this plastic foamed article can be attached to the headrest stay H easily and effectively.

Moreover, in the plastic foamed article according to this embodiment, regarding the region between the pair of opposite surfaces 21a and 21b, the one side in the radial direction of the attaching portion 6 in the held state and in the planar direction along the pair of opposite surfaces 21a and 21b is open, the other side is closed by the connecting surface 23 connecting the opposite surfaces to each other, and the plurality of protrusions 22 extend from the end portion on the one side of the upper surface 21a to the end portion on the other side in the pair of opposite surfaces 21a and 21b, while the tip end portion 22a of each of the plurality of protrusions 22 corresponding to the end portion on the one side is inclined in an R-shape so that the protruding amount decreases from the other side to the one side. As described above, since the tip end portion 22a of each of the plurality of protrusions 22 is inclined in the R-shape so that the protruding amount decreases from the other side (depth side) to the one side (front side) in the thickness direction, when the plastic foamed article holds the attaching portion 6 between the pair of opposite surfaces 21a and 21b from the open one side in the region between the pair of opposite surfaces 21a and 21b, a surface in contact between the attaching portion 6 and the R-shaped inclination of the tip end portion 22a of each of the plurality of protrusions 22 is suppressed, while a friction force between the attaching portion 6 and the tip end portion 22a of each, of the plurality of protrusions 22 is suppressed, and the attaching portion 6 is fitted into between the pair of opposite surfaces 21a and 21b while being smoothly guided without being caught by the tip end portion 22a of each of the plurality of protrusions 22. Thus, this plastic foamed article can be attached to the headrest stay H smoothly.

Moreover, in the plastic foamed article according to this embodiment, as the plurality of protrusions 22, three protrusions are provided at substantially equal intervals on the upper surface 21a of the pair of opposite surfaces 21a and 21b along the longitudinal direction of the attaching portion 6 in the held state. As described above, since three protrusions are provided as the plurality of protrusions 22 at substantially equal intervals in the horizontal direction on the front view on the upper surface 21a, the three protrusions 22 provided at substantially equal intervals are uniformly deformed by the headrest stay H and exert the restoring force. Thus, this plastic foamed article can be attached to the headrest stay H effectively.

Moreover, since the plurality of protrusions 22 are provided one each at the both ends in the horizontal direction of the upper surface 21a and at the center part, each of the plurality of protrusions 22 is uniformly deformed by the headrest stay H and exerts the restoring force. Thus, in this plastic foamed article, inclination and deviation in the thickness direction of the axis in the longitudinal direction of the attaching portion 6 relative to the region between the pair of opposite surfaces 21a and 21b is suppressed, and the plastic foamed article can be attached smoothly to the headrest stay H.

Moreover, since the auxiliary portion 4 of the plastic foamed article is fitted into between the pair of first linear portions 51 and 51 of the headrest stay H, and the auxiliary part 7 of the headrest stay H is fitted into the groove portion 3 of the plastic foamed article, this plastic foamed article can be attached to the headrest stay H firmly without looseness.

The plastic foamed article of the present invention is not limited to the above-described embodiment, but it is needless to say that various changes can be added within a range not departing from the gist of the present invention.

In this embodiment, the case in which the plastic foamed article is attached to the headrest stay H for a vehicle such as an automobile is described, but this is not essential, and the plastic foamed article may be configured so as to be attached to an armrest stay for a vehicle, a construction material and the like, for example, as long as the attaching target has the rod-shaped attaching portion 6. In this embodiment, the case in which the attaching portion 6 is configured having a cylindrical shape is described, but this is not essential, and the attaching portion 6 may be configured having a columnar shape with a circular or elliptic section or square columnar shape with or without a hollow portion along the longitudinal direction.

Moreover, in this embodiment, the case in which the plastic foamed article is constituted by including the body portion 1, the holding portion 2, the groove portion 3, and the auxiliary portion 4 is described, but this is not essential, and the plastic foamed article can be configured so as not to include the groove portion 3 and the auxiliary portion 4 but to include the body portion 1 and the holding portion 2.

Moreover, regarding the plastic foamed article of this embodiment, the case in which the pair of opposite surfaces 21a and 21b of the holding portion 2 are provided projecting from the planar portion 11 on the one side of the body portion 1 is described, but this is not essential, and in the plastic foamed article, the planar portion 11 of the body portion 1 is formed thicker on the front side in the thickness direction from the upper part side 11a to the lower part side 11b, and the opposing portion 21 of the holding portion 2 may be configured so as to be recessed in the groove shape in the planar portion 11 of the body portion 1.

Moreover, in the plastic foamed article of this embodiment, the case in which the three protrusions 22 are provided at substantially equal intervals along the horizontal direction on the front view is described, but this is not essential, and the plastic foamed article can be provided with one, two or four or more plural protrusions 22 along the horizontal direction, and moreover, when the plastic foamed article is provided with the plurality of protrusions 22, each interval between the plurality of protrusions 22 can be an arbitrary interval instead of the substantially equal intervals.

Figure 3:
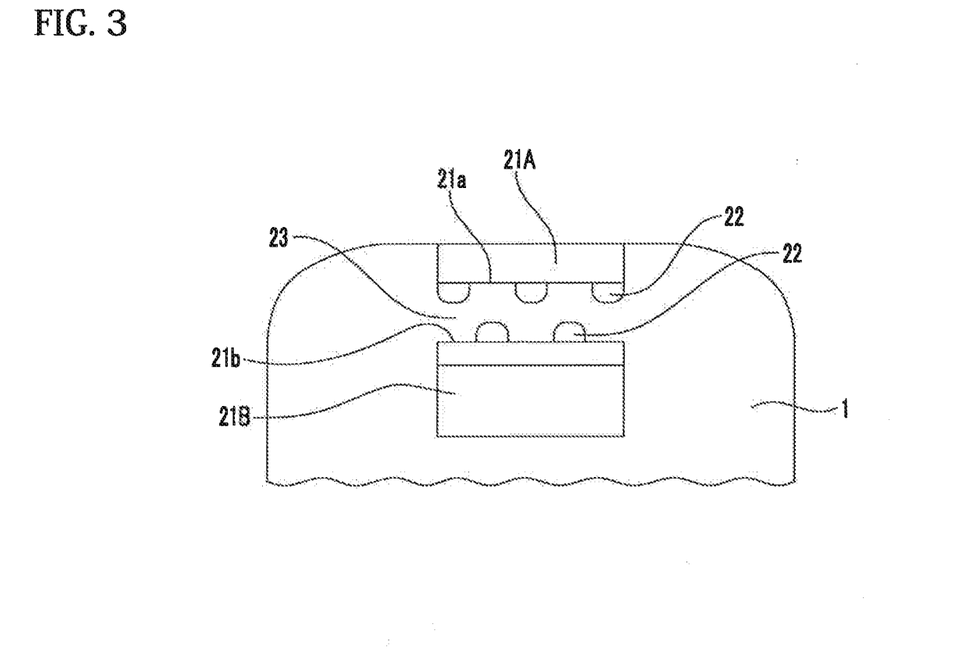
FIG. 3 is a front view illustrating a part of a plastic foamed article according to another embodiment.
Figure 4:
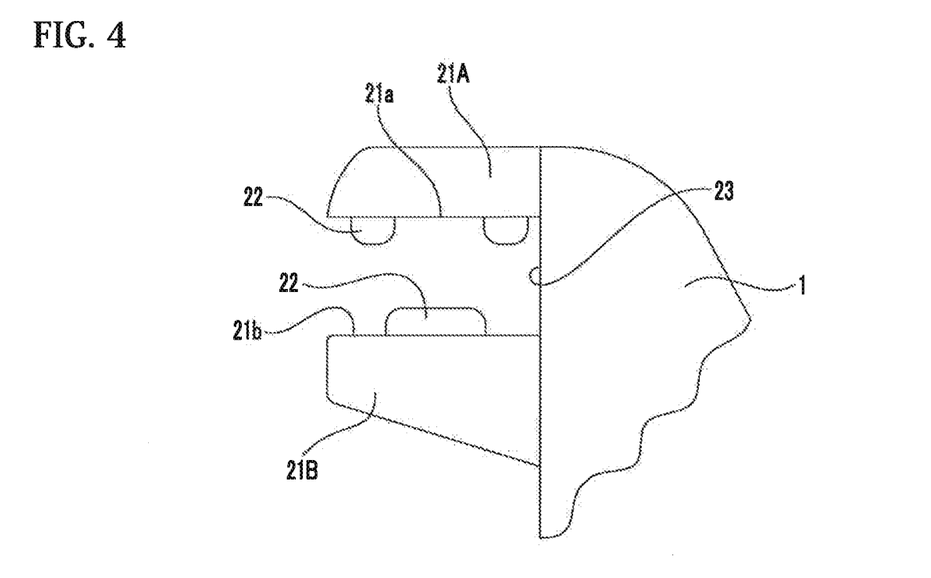
FIG. 4 is a side view illustrating a part of a plastic foamed article according to another embodiment.

Moreover, in this embodiment, the case in which the plurality of protrusions 22 are provided on the upper surface 21a of the pair of opposite surfaces 21a and 21b is described, but this is not essential, and only one protrusion 22 can be provided on the upper surface 21a or one or a plurality of the protrusions 22 can be provided only on the lower surface 21b of the pair of opposite surfaces 21a and 21b or on both the surfaces of the upper surface 21a and the lower surface 21b of the pair of opposite surfaces 21a and 21b. When one or a plurality of the protrusions 22 are to be provided on both the surfaces of the pair of opposite surfaces 21a and 21b, as illustrated in FIG. 3, one or a plurality of protrusions 22 (three in FIG. 3) on the upper surface 21a and one or a plurality of the protrusions 22 (two in FIG. 3) on the lower surface 21b may be provided alternately along the horizontal direction on the front view (that is, the longitudinal direction of the attaching portion 6 in the state in which the attaching portion 6 is held between the pair of opposite surfaces 21a and 21b). Alternatively as illustrated in FIG. 4, one or a plurality of protrusions 22 (two in FIG. 4) on the upper surface 21a and one or a plurality of the protrusions 22 (one in FIG. 4) on the lower surface 21b can be provided alternately along the thickness direction on the front view (that is, the radial direction of the attaching portion 6 and the planar direction of the opposite surfaces 21a and 21b in the state in which the attaching portion 6 is held between the pair of opposite surfaces 21a and 21b). As described above, when one or a plurality of the protrusions 22 are provided on both the surfaces of the pair of opposite surfaces 21a and 21b, the one or plurality of protrusions 22 provided on both the surfaces of the pair of opposite surfaces 21a and 21b are deformed by the attaching portion 6 and exert the restoring force and thus, the plastic foamed article can be attached to the headrest stay H effectively.

Figure 5A:
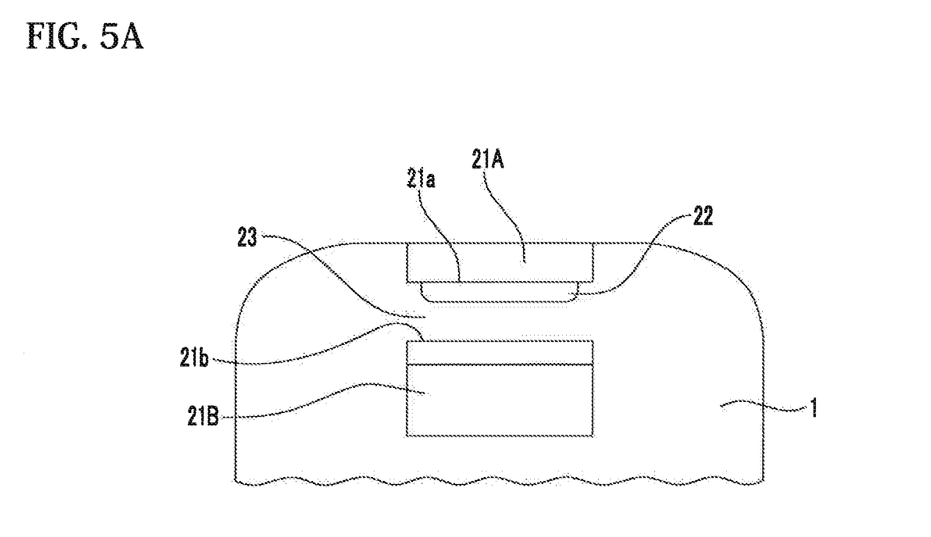
FIG. 5A is a front view illustrating a part of a plastic foamed article according to another embodiment.
Figure 5B:
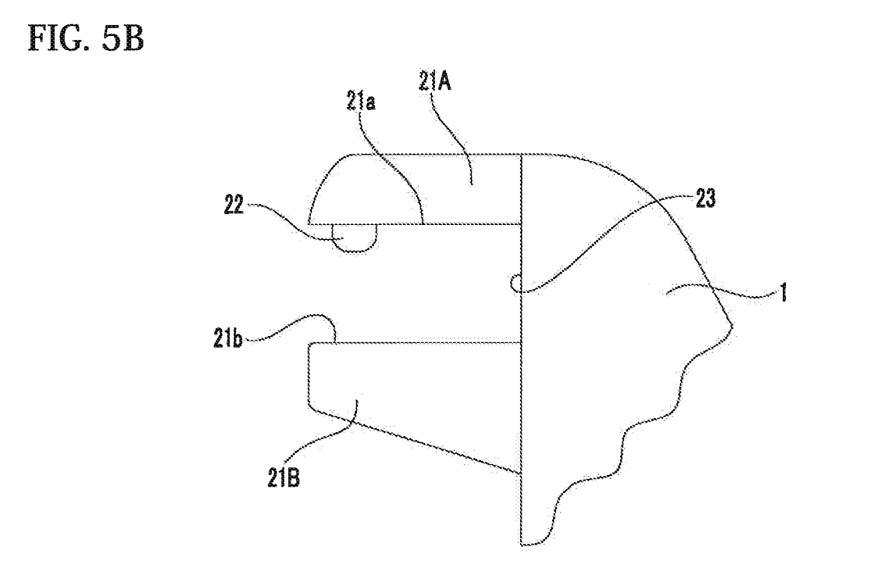
FIG. 5B is aside view illustrating apart of the plastic foamed article.

Moreover, in this embodiment, the case in which the plurality of protrusions 22 extend from the end portion on the other side (depth side) to the end portion on the one side (front side) of the upper surface 21a of the pair of opposite surfaces 21a and 21b, and the base end portion 22b continues to the connecting surface 23 is described, but this is not essential. One or a plurality of the protrusions 22 can be provided in the thickness direction such that the tip end portions 22a thereof do not extend to the end portion on the one side, and the base end portions 22b do not continue to the connecting surface 23 in the end portion on the other side (see FIG. 4). When one protrusion 22 is provided in the thickness direction, in the plastic foamed article, as illustrated in FIGS. 5A and 53, in a state in which one protrusion 22 elongated in the horizontal direction is provided on the upper surface 21a on the one side in the thickness direction, and the attaching portion 6 is held between the pair of opposite surfaces 21a and 21b, apart of the other side (depth side) in the thickness direction of the plurality of protrusions 22 may be configured to be elastically deformed by the attaching portion 6.

Figure 6:
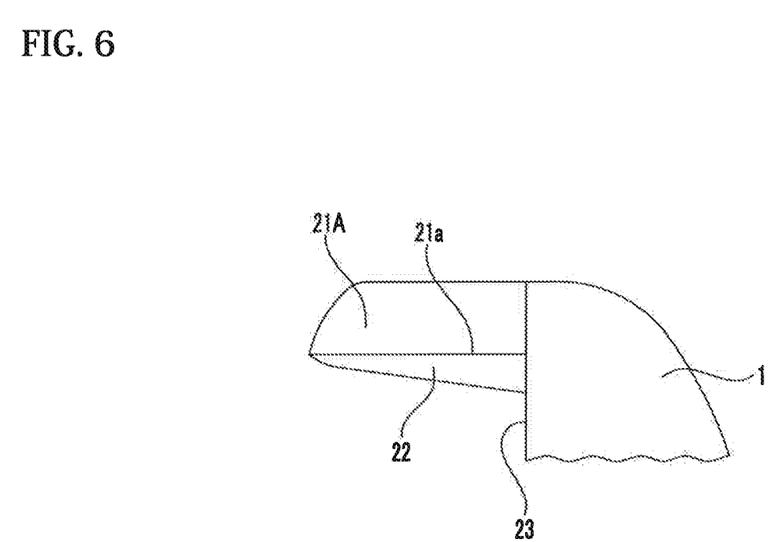
FIG. 6 is a side view illustrating a part of a plastic foamed article according to another embodiment.

Moreover, in this embodiment, the case in which the plurality of protrusions 22 extend from the end portion on the other side (depth side) of the upper surface 21a of the pair of opposite surfaces 21a and 21b to the end portion on the one side (front side) at substantially the same height is described, but this is not essential. One or a plurality of the protrusions 22 may be provided from the end portion on the other side (depth side) to the end portion on the one side (front side) with upward inclination as a whole so that the projection amount decreases from the other side toward the one side and the height is gradually reduced, as illustrated in FIG. 6. In such one or a plurality of the protrusions 22, since the attaching portion 6 is fitted into between the pair of opposite surfaces 21a and 21b while being guided along the inclination as a whole, the plastic foamed article can be attached to the headrest stay H smoothly. Moreover, when the plastic foamed article holds the attaching portion 6 between the pair of opposite surfaces 21a and 21b, elastic deformation (that is, the restoring force) of one or a plurality of the protrusions 22 on the other side (depth side) is large and elastic deformation (that is, the restoring force) of one or a plurality of the protrusions 22 on the one side (front side) is small. Thus, when the attaching portion 6 is to be removed from the one side (front side) of the region between the pair of opposite surfaces 21a and 21b, the plastic foamed article can be easily removed from the headrest stay H.

Figure 7:
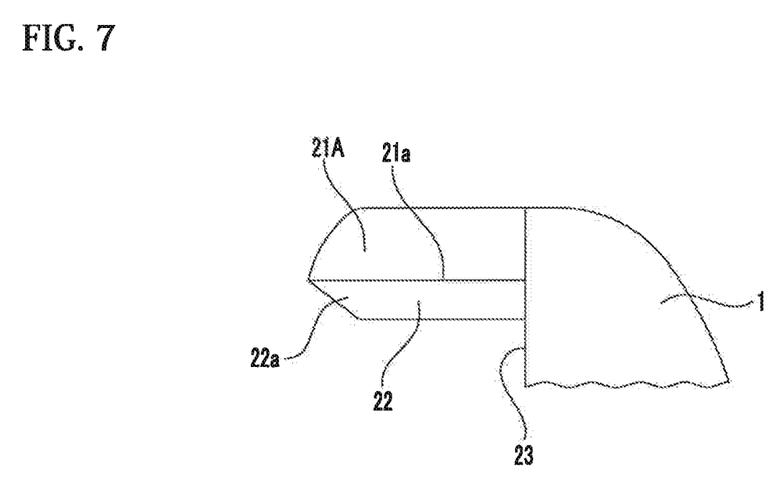
FIG. 7 is a side view illustrating a part of a plastic foamed article according to another embodiment.

Moreover, in this embodiment, the case in which the tip end portion 22a of each of the plurality of protrusions 22 is inclined in the R-shape is described, but this is not essential. In the one or plurality of protrusions 22, as illustrated in FIG. 7, a chamfered shape such that its tip end portion 22a is tapered can be taken, and furthermore, the tip end portion 22a can have a perpendicular section without inclination.

Moreover, in this embodiment, the case in which each of the plurality of protrusions 22 has a semicircular projected shape on the front view is described, but this is not essential. Each of the plurality of protrusions 22 may have a polygonal or elliptic projected shape on the front view.

Moreover, in this embodiment, the case in which each of the plurality of protrusions 22 extends from the end portion on the other side (depth side) of the upper surface 21a to the end portion on the one side (front side) with substantially the same width in the horizontal direction is described, but this is not essential. Each of the plurality of protrusions 22 may extend so that the width increases from the other side to the one side or decreases, that is, the width is made larger or smaller from the base end portion 22b toward the tip end portion 22a.

Moreover, in this embodiment, the case in which a part of the plurality of protrusions 22 is elastically deformed by the attaching portions 6 in the state in which the attaching portion 6 is held between the pair of opposite surfaces 21a and 21b is described, but this is not essential. All the plurality of protrusions 22 may be elastically deformed by the attaching portion 6 in the state in which the attaching portion 6 is held between the pair of opposite surfaces 21a and 21b.

REFERENCE SIGNS LIST

1 Body portion of plastic foamed article
2 Holding portion

3 Groove portion
4 Auxiliary portion
5 Insertion portion of headrest stay
6 Attaching portion
7 Auxiliary part
11 Planar portion
11a Upper part side
11b Lower part side
12 Projecting portion
12a Top portion
21 Opposing portion
21a Upper surface of pair of opposite surfaces
21A Upper piece
21b Lower surface of pair of opposite surfaces
21B Lower piece
22 Protrusion
22a Tip end portion
22b Base end portion
51 First linear portion
51a Tip end portion
52 Second linear portion
H Headrest stay

The invention claimed is:

1. A plastic foamed article to be attached to an attaching target having a rod-shaped attaching portion having a radial direction, comprising:
   a holding portion for holding the attaching portion in the radial direction in a state attached to the attaching target,
   wherein the holding portion is provided with a pair of opposite surfaces facing each other for holding the attaching portion between the pair of opposite surfaces and at least one protrusion provided on one of the pair of opposite surfaces;
   wherein a region between the pair of opposite surfaces has one side and an opposite side in the radial direction of the attaching portion in a held state where the attaching portion is held between the pair of opposite surfaces and also in a planar direction along the pair of opposite surfaces, the region being open on the one side, while the opposite side is closed by a connecting surface connecting the pair of opposite surfaces;
   wherein the at least one protrusion extends from an end portion on the one side to an end portion on the opposite side of one of the pair of opposite surfaces; and
   wherein the at least one protrusion is configured so that at least a part thereof is elastically deformed by the attaching portion in the held state.

2. The plastic foamed article according to claim 1, wherein the at least one protrusion is provided so as to occupy 2 to 15% of an area between the pair of opposite surfaces on a projection plane on a front view along the radial direction of the attaching portion in the held state and a planar direction along the pair of opposite surfaces.

3. The plastic foamed article according to claim 1, wherein the at least one protrusion has a semicircular projection shape on the front view.

4. The plastic foamed article according to claim 1, wherein a tip end portion of the at least one protrusion corresponding to the end portion on the one side is inclined so that a protruding amount decreases from the opposite side to the one side.

5. The plastic foamed article according to claim 1, wherein the at least one protrusion is a plurality of protrusions, and the plurality of protrusions are provided on one of the pair of opposite surfaces along a longitudinal direction of the attaching portion in the held state at substantially equal intervals.

6. The plastic foamed article according to claim 1, wherein the at least one protrusion is a plurality of protrusions, and the plurality of protrusions are provided on each of the pair of opposite surfaces.

7. The plastic foamed article according to claim 2, wherein the at least one protrusion has a semicircular projection shape on the front view.

8. The plastic foamed article according to claim 2, wherein a tip end portion of the at least one protrusion corresponding to the end portion on the one side is inclined so that a protruding amount decreases from the opposite side to the one side.

9. The plastic foamed article according to claim 3, wherein a tip end portion of the protrusion corresponding to the end portion on the one side is inclined so that a protruding amount decreases from the opposite side to the one side.

10. The plastic foamed article according to claim 7, wherein a tip end portion of the protrusion corresponding to the end portion on the one side is inclined so that a protruding amount decreases from the opposite side to the one side.

11. The plastic foamed article according to claim 2, wherein the at least one protrusion is a plurality of protrusions, and the plurality of protrusions are provided on one of the pair of opposite surfaces along a longitudinal direction of the attaching portion in the held state at substantially equal intervals.

12. The plastic foamed article according to claim 3, wherein the at least one protrusion is a plurality of protrusions, and the plurality of protrusions are provided on one of the pair of opposite surfaces along a longitudinal direction of the attaching portion in the held state at substantially equal intervals.

13. The plastic foamed article according to claim 4, wherein the at least one protrusion is a plurality of protrusions, and the plurality of protrusions are provided on one of the pair of opposite surfaces along a longitudinal direction of the attaching portion in the held state at substantially equal intervals.

14. The plastic foamed article according to claim 7, wherein the at least one protrusion is a plurality of protrusions, and the plurality of protrusions are provided on one of the pair of opposite surfaces along a longitudinal direction of the attaching portion in the held state at substantially equal intervals.

15. The plastic foamed article according to claim 8, wherein the at least one protrusion is a plurality of protrusions, and the plurality of protrusions are provided on one of the pair of opposite surfaces along a longitudinal direction of the attaching portion in the held state at substantially equal intervals.

16. The plastic foamed article according to claim 9, wherein the at least one protrusion is a plurality of protrusions, and the plurality of protrusions are provided on one of the pair of opposite surfaces along a longitudinal direction of the attaching portion in the held state at substantially equal intervals.

17. The plastic foamed article according to claim 2, wherein the at least one protrusion is a plurality of protrusions, and the plurality of protrusions are provided on each of the pair of opposite surfaces.

18. The plastic foamed article according to claim 3, wherein
the at least one protrusion is a plurality of protrusions, and the plurality of protrusions are provided on each of the pair of opposite surfaces.

19. The plastic foamed article according to claim 4, wherein
the at least one protrusion is a plurality of protrusions, and the plurality of protrusions are provided on each of the pair of opposite surfaces.

20. The plastic foamed article according to claim 5, wherein
the at least one protrusion is a plurality of protrusions, and the plurality of protrusions are provided on each of the pair of opposite surfaces.

\* \* \* \* \*